Patent 2,612,487

UNITED STATES PATENT OFFICE

2,612,487

SOLUTIONS OF HOMOPOLYMERS OF CERTAIN OPTICALLY ACTIVE ALPHA-AMINO ACIDS IN POLYCHLORO- AND POLYFLUORO-ACETIC ACIDS

Ralph E. Miegel, Elsmere, Del., assignor to E. I. du Pont de Nemours and Company, Wilmington, Del., a corporation of Delaware No Drawing. Application November 24, 1950, Serial No. 197,514

12 Claims. (Cl. 260—31.2)

This invention relates to optically active linear alpha-amino acid homopolyamides and, more particularly, to new and useful fluid compositions of these homopolyamides.

Certain of the low molecular weight alpha-amino acid polyamides previously known in the art have variously been reported as soluble in selected acids. For instance, Curtius, J. prakt. Chem., 125, 211–302 (1930), reports that DL-leucine and DL-valine homopolyamides are soluble, respectively, in warm acetic and warm concentrated hydrochloric acids. Wesseley and Sigmund, Z. physiol. Chem. 159, 102–119 (1926) report that sarcosine homopolyamide is rather difficultly soluble in acetic acid. Tullock U. S. Patent 2,516,162 discloses halogenated hydrocarbons such as chloroform as solvents for synthetic copolyamides of certain alpha-amino acids. Tullock U. S. Patent 2,517,610 discloses the use of alicyclic ketones as solvents for these copolyamides. Tullock U. S. Ser. No. 74,243 discloses formic acid as a solvent for a limited group of synthetic alpha-amino acid polyamides. Carothers U. S. Patent 2,130,948 discloses monochloroacetic acid as a solvent for synthetic linear polyamides formed from diamines and dibasic acids.

Recently it has been discovered that the optically active alpha-amino acid homopolyamides are outstanding in many respects such as their surprising toughness, strength and desirable film- and fiber-forming characteristics, as described in greater detail in the copending application of MacDonald Ser. No. 108,237, filed August 2, 1949. A continuation in part of said application was filed December 28, 1950, as Serial No. 203,213. Certain of these optically active homopolyamides are insoluble in all of the common organic solvents including those which are solvents for most of the other alpha-amino acid homo- and co-polyamides. More specifically, it has been found that the optically active, straight-chain, alpha-amino acid homopolyamides are insoluble in, among other things, halogenated hydrocarbons, e. g., chloroform, chlorobenzene; aromatic hydrocarbons, e. g., benzene; alicyclic ketones, e. g., cyclohexanone; phenols, e. g., m-cresol; and formic and monochloroacetic acids.

This invention has as an object the preparation of solutions of optically active, straight-chain, alpha-amino acid homopolyamides. Other objects will appear hereinafter.

These objects are accomplished by the present invention of solutions of one or more optically active, straight-chain alpha-amino acid homopolyamides in acetic acids having on the alpha carbon from 2 to 3 atoms of halogen of atomic number less than 18, wherein any remaining valence of the alpha carbon not satisfied by said halogen atoms or by the single carboxyl is satisfied by hydrogen. These solutions are particularly useful for the preparation of films and fibers from the polyamides.

The solubility characteristics of these alpha-amino acid polyamides are quite critical and completely unpredictable. In the first place, the physical properties of this general class of optically active alpha-amino acid homopolyamides are surprising in that the polyamides are so much tougher, so much stronger, so readily orientable in contrast to the other alpha-amino acid polyamides known in the art. In fact, the strongest and toughest films thus far obtained in the amino acid polyamide field have been those of the optically active alpha-amino acid homopolyamides.

Certain of these optically active homopolyamides whose units are branched chain in nature, e. g., poly-D- or L-leucine, exhibit solubilities in certain of the solvents previously found for the optically inactive alpha-amino acid polyamides. Specifically poly-L-leucine is soluble in aromatic hydrocarbon solvents, e. g., benzene, preferably in the presence of a small amount of a viscosity depressant of energy density greater than 95, e. g., chloral, as described in greater detail in the copending application of Nichols, Ser. No. 65,720, filed December 16, 1948. Strong and tough films and fibers of this homopolyamide can be obtained from such solutions. On the other hand, poly-L-leucine is insoluble in chloroform, m-cresol, methylene chloride, phenol, tetrachloroethane, xylene, formic, monochloroacetic, and dichloroacetic acids. In contrast to the solubility of diamine-dibasic acid polyamides in formic and monochloroacetic acids, the optically active alpha-amino acid homopolyamides are insoluble in these acids. However, the optically active, straight-chain alpha-amino acid homopolyamides are all soluble in the di- and trifluoro- and chloroacetic acids. This solubility is in surprising contrast to the insolubility in such acids, e. g., dichloroacetic acid, of branched chain, optically active alpha-amino acid homopolyamides.

The term "optically active, straight-chain alpha-amino acid homopolyamides" is used herein to define those alpha-amino acid homopolyamides consisting essentially of recurring units of a single optically active alpha-amino acid, more particularly combined units of a single antipode of an optically active alpha-amino acid, said acid carrying on its alpha-carbon in addition to the amino and carboxyl groups, one hydrogen and a straight chain, i. e., normal, aliphatic radical. The optically active, straight-chain aliphatic alpha-amino acid homopolyamides with which this invention is concerned thus consist essentially of combined units of single antipodal species of C-mono-substituted glycines wherein the single substituent possesses a straight-chain, i. e., normal, carbon skeleton.

The term "cold drawable" used in the specification refers to that phenomenon exhibited by the polyamides used in this invention, which is described generally in the art on high molecular weight polymers, for example, on page 182, vol. I of High Polymers, Interscience Publishers, Inc., 1940 and in lines 15 through 63, page 7, column 1, of U. S. Patent 2,071,250, i. e., the special property exhibited by certain polymers in film or fiber form, when mechanical stress is gently applied at room or slightly elevated temperatures, of not breaking apart, but separating into two non-oriented sections joined by a thinner section of more highly oriented polymer. As the mechanical stress, i. e., pulling is continued, this more highly oriented section grows at the expense of the unoriented sections until the latter are completely exhausted. A remarkable feature of this phenomenon is the sharpness of the boundary at the junction between the highly oriented and less oriented sections of the film or fiber being drawn. During the drawing operation, the shape of this boundary does not change. It merely advances linearly through the undrawn sections of the polymer until the latter are exhausted. This operation can be carried out very rapidly and smoothly. It leads to permanently elongated, highly and permanently oriented films and fibers of uniform cross section and of greatly improved strength, toughness, and elasticity, which exhibit a high degree of birefringence and a parallel extinction between crossed Nicol prisms and display a typically oriented film and fiber diagram when examined by X-ray methods in the usual way.

The following examples in which the parts given are by weight are submitted to further illustrate but not to limit this invention. As used therein, inherent viscosity ($\eta_{inh.}$) is defined by the following equation:

$$\eta_{inh.} = \frac{\ln \eta_{rel.}}{C}$$

wherein ln is the natural logarithm, $$\eta_{rel.} = \frac{\eta \text{ solution}}{\eta \text{ solvent}}$$

being viscosity, C is the concentration of the solute in grams per 100 cc. of solution. Unless otherwise noted all inherent viscosity results are obtained with the polyamide involved dissolved in dichloroacetic acid at a concentration of 0.3 gram of polymer per 100 cc. of solution at 25° C. Intrinsic viscosity, $[\eta]$, as used in these examples is defined by the following equation:

$$[\eta] = C \xrightarrow{\lim} 0 \frac{\ln \eta_{rel.}}{C}$$

wherein ln, C and $\eta_{rel.}$ are as defined above. In all instances the intrinsic viscosity figures given are determined from a series of results obtained with the polyamide involved dissolved in dichloroacetic acid at various decreasing concentrations.

Example I

A 0.38 part sample of the homopolyamide from L-alanine (prepared by polymerizing the corresponding N-carboanhydride in refluxing benzene for a period of about six days under anhydrous conditions) is dissolved by stirring at room temperature in 12.50 parts of dichloroacetic acid. The resulting viscous solution is poured in three portions in thin films onto three glass plates. The plates and the thin liquid layers cast thereupon are immersed in water, alcohol, and acetone baths, respectively. These baths all serve as coagulating agents for the dichloroacetic acid solutions thereby precipitating the starting L-alanine homopolyamide in thin film form. The films thus obtained, after being washed free of the solvents and dried, are clear, tough and strong. A sample of the film obtained from the alcohol coagulating bath is readily cold drawable and necks down in the characteristic manner. Another sample of the homopolyamide similarly prepared from L-alanine is insoluble in formic acid, m-cresol, aqueous phenol, chloroform and glacial acetic acid and exhibits an inherent viscosity of 2.21 in dichloroacetic acid.

Example II

A 15 part sample of the homopolyamide from L-alanine ($\eta_{inh.}=1.03$) is dissolved in 234 parts of dichloroacetic acid at room temperature and 13 parts of water. The clear, bright, homogeneous solution thus obtained is pressure filtered and then pressure spun at the rate of 3.77 ml. per minute through a 30 hole (0.005 inch hole diameter) stainless steel spinneret into a water coagulating bath at 50 to 60° C. The yarn travel in the coagulating bath is 104 inches and the windup of the coagulated yarn on the Godet wheel is at the rate of 19.5 feet per minute. The yarn is stretched 2.88 times in air at room temperature in being removed from the Godet wheel to a takeup bobbin at 56 feet per minute. The various yarns are water washed overnight on the bobbin, taut, dried in air on the bobbin, twisted and finally boiled off in skein form. The yarn thus obtained exhibits a denier of 78, a tenacity of 3.5 grams per denier (g./d.) and 6% elongation (as measured on the Incline Plane), and a modulus at 100% of 105 g./d.

Yarn similarly prepared from another sample of the homopolyamide from L-alanine drawn 2.3 times, exhibits a denier of 133.3 and a tenacity of 2.02 grams per denier and 21% elongation. This yarn exhibits a modulus at 100% of 84 g./d., a shrinkage in water of 0.7%, and a sticking point of over 400° C. The X-ray diffraction pattern of this yarn is highly oriented and indicates the presence of less amorphous material than patterns of DL-alanine yarns. The X-ray chain identity period of the L-alanine yarns is 6.98 Å.

Example III

Samples of the homopolyamide from D-alanine (prepared by polymerizing the corresponding N-carboanhydride in refluxing benzene for about seven days and of $[\eta]=4.07$) are dissolved in dichloroacetic acid and the clear solutions poured in thin films onto glass plates. The films are coagulated by immersing the plates in a water coagulating bath and are removed and dried at 80–85° C. in a vacuum oven to constant weight. These films (about 0.011 inch thick) are readily cold drawable directly. Samples of these films, after being soaked in 2-B alcohol to facilitate the drawing and then cold drawn to 2.0 to 2.5 times, exhibit tensile strengths of almost 19,000 lb./sq. in. and elongations of about 11% (as measured on the Instron Tensile Tester).

Example IV

A sample of the homopolyamide from L-alpha-amino-n-butyric acid (prepared by polymerizing the corresponding N-carboanhydride in refluxing benzene for about six days and of $\eta_{inh.}=1.29$) is dissolved at room temperature in an excess of trichloroacetic acid containing sufficient water (about 7%) so as to liquefy the acid. The polymer is recoverable from the solution by precipitation into an excess of water.

Similar results are obtained using another L-alpha-amino-n-butyric acid polyamide of $$\eta_{inh.}=0.76$$

and trichloroacetic acid alone at slightly elevated temperatures. The trichloroacetic acid becomes molten at 50–58° C. and serves as a satisfactory solvent as long as the temperature is maintained in this range.

Example V

A 1.2 part sample of the homopolyamide from L-alpha-amino-n-butyric acid is dissolved in 15.6 parts of dichloroacetic acid and the resulting clear viscous solution poured in a thin film onto a glass plate. The film is coagulated by immersing the plate in a water coagulating bath. After being removed from the casting surface, washed free of dichloroacetic acid, and dried at 65° C., there is obtained a tough, strong film of the homopolyamide. This film, after being soaked from 30 to 40 minutes in 2-B alcohol, can be readily cold drawn about 2 times. X-ray examination of the drawn film indicates orientation and high crystallinity.

Example VI

A sample of the homopolyamide from L-alanine (prepared by polymerizing the corresponding N-carboanhydride in refluxing benzene for approximately seven days under anhydrous conditions and of $\eta_{inh.}=2.74$) is dissolved by stirring at about 60° C. in an excess of trichloroacetic acid containing sufficient water (approximately 7%) to liquefy the acid. The polymer is recoverable from solution by precepitation into water.

Similar results are obtained utilizing an L-alanine homopolyamide of $\eta_{inh.}=3.05$ and anhydrous trichloroacetic acid at elevated temperatures in the neighborhood of 60° C.

Example VII

A sample of the homopolyamide from L-alpha-amino-n-butyric acid (prepared by polymerizing the corresponding N-carboanhydride in refluxing benzene for about six days and of $\eta_{inh.}=1.29$) is dissolved at room temperature in an excess of trifluoroacetic acid. The polymer is recoverable from the solution by precipitation into an excess of water.

Example VIII

A sample of the homopolyamide from L-alanine (prepared by polymerizing the corresponding N-carboanhydride in refluxing benzene for approximately twelve days under anhydrous conditions and of $\eta_{inh.}=3.05$) is dissolved by stirring at about 60° C. in an excess of trifluoroacetic acid. The polymer is recoverable from solution by precipitation into water. Upon pouring the solution in a thin film onto a glass plate and allowing the trifluoroacetic acid to evaporate at room temperature in a hood, there is obtained a thin, slightly opaque, self-supporting film of the L-alanine homopolyamide.

This invention is generic to solutions of optically active, straight-chain alpha-amino acid homopolyamides in acetic acids of the following structure, $H_mX_nCCOOH$, wherein $m$ is a cardinal number not greater than 1, $n$ is an integer from 2 to 3, and the sum of $m$ and $n$ is 3, and X is halogen of atomic number not greater than 18. The halogen-substituted acetic acids, which together with the optically active, straight-chain alpha-amino acid homopolyamides constitute the solutions of this invention, are thus: chlorofluoroacetic, difluoroacetic, trifluoroacetic, difluorochloroacetic, dichloroacetic, trichloroacetic, and dichlorofluoroacetic acids. Due to the greater ease in preparing solutions therefrom, it is preferred to use the above di- and tri-substituted-fluoro- or chloroacetic acids which are liquids under normal conditions of temperature and pressure. Particularly preferred among these acids is dichloroacetic acid, which not only is liquid under normal conditions but also exerts no apparent degradative effect upon the straight-chain, optically active alpha-amino acid homopolyamides. For example, samples of these homopolyamides have been dissolved in dichloroacetic acid, allowed to stand for several hours, recovered by precipitation into water, and dried. The inherent viscosity of the homopolyamide finally recovered, as measured in dichloroacetic acid, is, within experimental error, identical with the inherent viscosity initially obtained in dichloroacetic acid on the original sample of the optically active, straight-chain alpha-amino acid homopolyamide.

The solutions of this invention will usually contain from 0.5 to 30.0%, preferably from 1.0 to 10.0% by weight of the homopolyamides. The solutions can be prepared at any given solids concentration in the above range in less time if the optically active, straight-chain alpha-amino acid homopolyamides is finely divided and/or the resulting mixture of the homopolyamides and the di- or tri-chloro- or fluoroacetic acids of this invention is heated, e. g., from 30 to 100° C., preferably from 30 to 50° C. Temperatures higher than 100° C. are to avoided in preparing the solution compositions of this invention because the homopolyamides tend to degrade, i. e., decrease in molecular weight under such conditions.

Examples of the optically active, straight-chain alpha-amino acids, preferably of 3 to 14 carbons, the homopolyamides from which in solution in an acetic acid having a plurality of chlorine and/or fluorine substituents constitute the compositions of this invention, include the primary amino acids, e. g., D- and L-alanine, D- and L-alpha-amino-n-butyric acid, D- and L-norvaline, D- and L-norleucine, D- and L-alpha-aminomyristic acid, D- and L-alpha-aminolauric acid, D- and L-alpha-amino-n-heptanoic acid, D- and L-alpha-amino-n-octanoic acid, D- and L-alpha-aminocapric acid; the secondary amino acids, e. g., N-substituted, optically active, straight-chain alpha-amino acids, preferably of 3 to 8 carbons in the main carbon skeleton, wherein the N-substituent is of 1 to 6 carbons, preferably solely hydrocarbon, e. g., N-phenylalanine, but most preferably lower alkyl hydrocarbon such as, D- and L-N-methylalanine, D- and L-N-ethyl-alpha-amino-n-butyric acid, D- and L-N-propylnorvaline; the polyfunctional, optically active, straight-chain alpha-amino acids, i. e., the optically active, straight-chain alpha-amino acids which contain, in addition to the alpha-amino and carboxyl groups, at least one other functional group, such as, D- and L-epsilon-acetoxy-alpha-aminocaproic acid, D- and L-epsilon-hydroxy-alpha-aminocaproic acid, D- and L-methionine, D- and L-beta - carbonamido - alpha - aminopropionic acid and the like. Homopolyamides of wholly saturated aliphatic primary and secondary alpha-amino acids which apart from amino nitrogen and carboxyl oxygen contain only carbon and hydrogen are preferred.

Because of the more desirable properties exhibited by the films, fibers and coatings prepared therefrom, those compositions of this invention are preferred wherein the units of the optically active, straight-chain alpha-amino acid homopolyamides consist of such alpha-amino acid units which, apart from the amino and carboxyl groups, are solely saturated aliphatic hydrocarbon. A particularly preferred group of such polyamides are those wherein the alpha-amino acid units are those of such primary alpha-amino acids which furthermore are, other than the amino nitrogen and carboxyl oxygens, solely hydrocarbon and of no more than six carbons and most preferably of no more than four carbons, i. e., C-mono-lower alkyl primary glycines, i. e., glycines having on the alpha carbon an alkyl group of not more than four and preferably not more than two carbons.

These optically active, straight-chain alpha-amino acid homopolyamides, which in solution in the polyfluoro- and/or chlorosubstituted acetic acids constitute the compositions of this invention, can be prepared from any of the amino-forming derivatives of the corresponding alpha-amino acid, e. g., the esters, the acids themselves, the carbon dioxide adducts of the acids, the N-carboanhydrides and the like. Because of their readier preparability and high efficiency in the polyamide forming reaction, it is preferred to use the N-carboanhydrides of these alpha-amino acids.

The preparation of these N-carboanhydrides is discussed in detail in the copending applications of MacDonald Ser. Nos. 778,458, filed October 7, 1947, 83,299, filed March 24, 1949, and Prichard Ser. No. 52,971, filed October 5, 1948. Methods for their polymerization are discussed in these copending applications and also in the copending applications of MacDonald Ser. Nos. 778,032 and 778,031, filed October 4, 1947. The general group of the optically active alpha-amino acid homopolyamide, including both the straight and branched chain alpha-amino acids, and their surprising strength, toughness, and other desirable properties are discussed in detail in the copending application of MacDonald Ser. No. 108,237, filed August 2, 1949. A continuation in part of said application was filed December 28, 1950, as Serial No. 203,213.

The compositions of this invention, by reason of the desirable properties of the polyamides used, find valuable application in the manufacture of films, coatings and fibers by standard casting and wet spinning procedures well known in the art. Because of their outstanding properties the preferred compositions of this invention are those containing from 0.5 to 30.0%, most preferably 1.0 to 10.0%, by weight of the total composition of optically active, straight-chain alpha-amino acid homopolyamides of degree of polymerization (DP) at least 50 and preferably higher, i. e., those containing at least 50 combined optically active, straight-chain alpha-amino acid units in the polyamide chain. The polyhalogenated acetic acid forms in general the remainder of the solution although up to 10% water is tolerated by the solution.

Modification of the properties of these optically active, straight-chain alpha-amino acid homopolyamides may be effected in the solutions of this invention. For instance, if desired, the optically active alpha-amino homopolyamide may be controllably crosslinked by reaction with formaldehyde. In the case of the optically active, straight-chain alpha-amino acid homopolyamides containing functional groups other than the alpha-amino and carboxyl groups, modifications of these extra functional groups may also be carried out in the solutions of this invention. For instance, poly-D-methionine may have any desired amount of the extralinear methyl thioether groups converted to methylsulfonium iodide groups by reaction with methyl iodide or oxidized to methyl sulfone or sulfoxide groups by controlled oxidation.

In addition to modifying agents as disclosed in general above, plasticizers, films, pigments, dyes and the like may be present in the solutions of this invention. However, to maintain their high degree of utility and the excellent properties therefrom the compositions of this invention should not contain less than 0.5% of the optically active, straight-chain alpha-amino acid homopolyamides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A solution, in dichloroacetic acid, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to a primary amino, —NH₂, group, a hydrogen atom, and an alkyl radical of one to two carbons.

2. A solution, in dichloroacetic acid, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to a primary amino, —NH₂, group, a hydrogen atom, and a straight chain alkyl radical of one to four carbons.

3. A solution, in dichloroacetic acid, containing 0.5 to 30%, by weight of the total composition, of an optically active alanine homopolyamide of degree of polymerization of at least 50, the recurring alanine units of said homopolyamide consisting essentially of the same optically active antipodal alanine species.

4. A solution, in dichloroacetic acid, containing 0.5 to 30%, by weight of the total composition, of an optically active homopolyamide of degree of polymerization of at least 50, the units of said polymer consisting essentially of units of a single antipode of an optically active alpha-monoaminomonocarboxylic acid wherein the amino group is a primary amino, —NH₂—, group and the acid portion has a normal carbon chain.

5. A solution, in dichloroacetic acid, containing 0.5 to 30%, by weight of the total composition, of an optically active homopolyamide of degree of polymerization of at least 50, the units of said polymer consisting essentially of units of a single antipode of an optically active alpha-monoaminomonocarboxylic acid having hydrogen on the nitrogen and having a normal carbon chain directly attached to the carboxyl.

6. A solution, in dichloroacetic acid, containing 0.5 to 30%, by weight of the total composition, of an optically active homopolyamide of degree of polymerization of at least 50, the units of said polymer consisting essentially of units of a single antipode of an optically active alpha-monoaminomonocarboxylic acid having hydrogen on the nitrogen, having, directly attached to the carboxyl, a normal carbon chain, and containing, apart from the amino nitrogen and carboxyl oxygen, only carbon and hydrogen.

7. A solution, in dichloroacetic acid, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to a primary amino, —NH₂, group, a hydrogen atom, and a straight chain aliphatic radical.

8. A solution, in dichloroacetic acid, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to a primary amino, —NH₂, group, a hydrogen atom, and a straight chain organic radical.

9. A solution, in dichloroacetic acid, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to an amino group, a hydrogen atom, and a straight chain organic radical.

10. A solution, in an acetic acid $H_mX_nCCO_2H$ wherein $m$ is a cardinal number not more than 1, $n$ is an integer from 2 to 3, $m+n$ equals 3 and X is a halogen of atomic number not greater than 18, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to an amino group, a hydrogen atom, and a straight chain organic radical.

11. A solution, in an acetic acid $H_mX_nCCO_2H$ wherein $m$ is a cardinal number not more than 1, $n$ is an integer from 2 to 3, $m+n$ equals 3 and X is a halogen of atomic number not greater than 18, containing 0.5 to 30%, by weight of the total composition, of an optically active homopolyamide of degree of polymerization of at least 50, the units of said polymer consisting essentially of units of a single antipode of an optically active alpha-monoaminomonocarboxylic acid having hydrogen on the nitrogen, having, directly attached to the carboxyl, a normal carbon chain, and containing, apart from the amino nitrogen and carboxyl oxygen, only carbon and hydrogen.

12. A solution, in an acetic acid $H_mX_nCCO_2H$ wherein $m$ is a cardinal number not more than 1, $n$ is an integer from 2 to 3, $m+n$ equals 3 and X is a halogen of atomic number not greater than 18, containing 0.5 to 30%, by weight of the total composition, of an optically active homopolyamide of degree of polymerization of at least 50, the units of said polymer consisting essentially of units of the same optically active antipodal species of an alpha-monoaminomonocarboxylic acid wherein the carbon alpha to the carboxyl group is bonded to a primary amino, —NH₂, group, a hydrogen atom, and a straight chain alkyl radical of one to four carbons.

RALPH E. MIEGEL.

REFERENCES CITED

The following references are of record in the file of this patent:

Journal of the Chemical Society, pages 3009–3013, November 1950, (rec'd for publication June 28, 1950).